(12) United States Patent
Talavasek (10) Patent No.: US 8,439,383 B2
(45) Date of Patent: May 14, 2013

(54) BICYCLE SHOCK WITH EXTENSION ARMS

(75) Inventor: Jan Talavasek, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 593 days.

(21) Appl. No.: 12/495,516

(22) Filed: Jun. 30, 2009

(65) Prior Publication Data

US 2010/0327553 A1 Dec. 30, 2010

(51) Int. Cl.
*B62K 25/28* (2006.01)

(52) U.S. Cl.
USPC .......................................... 280/285; 280/275

(58) Field of Classification Search .................. 280/284, 280/285, 283, 275, 288; 180/227
See application file for complete search history.

(56) References Cited

U.S. PATENT DOCUMENTS

| | | |
|---|---|---|
| D34,257 S | 3/1901 | Sangster |
| D43,083 S | 10/1912 | Lonn |
| D44,950 S | 10/1913 | Lonn |
| 1,340,508 A | 5/1920 | Walker |
| 1,413,352 A | 4/1922 | Peters |
| 2,238,411 A | 4/1941 | Conklin |
| 3,679,029 A | 7/1972 | Thomas |
| 3,982,770 A | 9/1976 | Satoh et al. |
| 4,013,149 A | 3/1977 | Fabre et al. |
| 4,046,396 A | 9/1977 | Taylor et al. |
| 4,378,857 A | 4/1983 | Andersson |
| 4,697,659 A | 10/1987 | Zimmerman |
| 4,789,174 A | 12/1988 | Lawwill |
| 5,244,224 A | 9/1993 | Busby |
| 5,592,999 A | 1/1997 | Matsuura et al. |
| 5,671,936 A | 9/1997 | Turner |
| 5,725,227 A | 3/1998 | Mayer |
| 5,791,674 A | 8/1998 | D'Aluisio et al. |
| D398,267 S | 9/1998 | Yu et al. |
| D401,187 S | 11/1998 | Ninic et al. |
| D402,926 S | 12/1998 | Kciuk |
| 5,899,480 A | 5/1999 | Leitner |
| 6,039,137 A | 3/2000 | Schless |
| D430,070 S | 8/2000 | Kciuk |
| 6,109,636 A | 8/2000 | Klein et al. |
| 6,224,080 B1 | 5/2001 | Ross |
| 6,244,610 B1 * | 6/2001 | Kramer-Massow .......... 280/283 |
| 6,273,407 B1 | 8/2001 | Germano |

(Continued)

FOREIGN PATENT DOCUMENTS

| | | |
|---|---|---|
| EP | 1 352 823 | 10/2003 |
| EP | 1 669 282 | 6/2006 |

(Continued)

OTHER PUBLICATIONS

Diamondback DBR-X2 1999.

(Continued)

*Primary Examiner* — Anne Marie M Boehler
(74) *Attorney, Agent, or Firm* — Knobbe Martens Olson & Bear LLP (57) ABSTRACT

A bicycle frame can have a main frame, a sub-frame and a shock. The sub-frame can move in relation to the main frame and the shock can be used to regulate that relationship. A linkage can also be used to regulate the relationships and control the rotation. The shock can further have a pair of extension arms to span a seat tube which is part of the main frame.

20 Claims, 13 Drawing Sheets

U.S. PATENT DOCUMENTS

| | | |
|---|---|---|
| 6,279,703 B1 | 8/2001 | Mete |
| 6,318,521 B1 | 11/2001 | Niaura et al. |
| D491,111 S | 6/2004 | Mizuta et al. |
| 6,837,506 B2 | 1/2005 | Amos |
| 6,877,591 B1 | 4/2005 | Hso |
| 6,880,846 B2 | 4/2005 | Schonfeld |
| 6,969,081 B2 | 11/2005 | Whyte |
| 6,978,985 B2 | 12/2005 | Lung et al. |
| D523,380 S | 6/2006 | Auger et al. |
| 7,140,628 B2 | 11/2006 | Parkin |
| 7,261,194 B2 | 8/2007 | Fox |
| 7,318,505 B2 | 1/2008 | Müller et al. |
| 7,374,191 B1 | 5/2008 | Tseng |
| 7,392,999 B2 | 7/2008 | O'Connor |
| 7,467,803 B2 | 12/2008 | Buckley |
| 7,506,884 B2 | 3/2009 | Fox |
| 7,703,788 B2 | 4/2010 | Tanouye et al. |
| 7,938,425 B2 | 5/2011 | Chamberlain |
| 7,954,837 B2 | 6/2011 | Talavasek |
| 7,963,541 B2 | 6/2011 | Chamberlain |
| 2003/0038450 A1 | 2/2003 | Lam |
| 2003/0160372 A1 | 8/2003 | Klitsch et al. |
| 2004/0061305 A1 | 4/2004 | Christini |
| 2005/0184483 A1 | 8/2005 | Buckley |
| 2006/0181053 A1 | 8/2006 | Huang et al. |
| 2007/0246909 A1* | 10/2007 | Weng .................... 280/284 |
| 2008/0067772 A1 | 3/2008 | Weagle |
| 2008/0258427 A1 | 10/2008 | Buckley |
| 2008/0303242 A1 | 12/2008 | O'Connor |
| 2009/0026728 A1 | 1/2009 | Domahidy |
| 2009/0072512 A1 | 3/2009 | Earle |
| 2010/0059965 A1* | 3/2010 | Earle .................... 280/284 |
| 2010/0109282 A1 | 5/2010 | Weagle |
| 2011/0018228 A1 | 1/2011 | Beale et al. |

FOREIGN PATENT DOCUMENTS

| | | |
|---|---|---|
| JP | 07-223577 | 8/1995 |
| JP | 07-233839 | 9/1995 |
| WO | WO 2007/036225 | 4/2007 |

OTHER PUBLICATIONS

Giant Pistol 2007.
Manitou FS 1996.
Ibis Mojo Carbon Setup Guide 2007.
Davis, Previewed: GT Fury Downhill Race Bike, www.bikemag.com, Jun. 24, 2008.
Methven, "Scott Ransom SL", Dirt Rag, Apr. 1, 2007, pp. 52-53.
"Titus Does it Our Way", Mountain Bike Action, Jul. 2005, pp. 50-52.
International Search Report and Written Opinion for International Application No. PCT/US2011/028377, Notification mailed Apr. 27, 2011.

* cited by examiner

BICYCLE SHOCK WITH EXTENSION ARMS

BACKGROUND OF THE INVENTION

1. Field of the Invention

The present invention relates generally to bicycle suspension systems and frame assemblies. In particular, the present invention relates to configurations for rear suspension assemblies and mounting arrangements for rear suspension assemblies suitable for use in connection with off-road bicycles.

2. Description of the Related Art

Off-road bicycles, or mountain bikes, may be equipped with front and rear suspension assemblies operably positioned between the frame of the bicycle and the front and rear wheels, respectively. Providing front and rear suspension on a mountain bike potentially improves handling and performance by absorbing bumps, and other rough trail conditions, which may be encountered while riding off-road. However, because mountain bikes are typically pedal-driven, i.e., use the rider's power output to propel the bicycle, the provision of rear suspension, especially, may undesirably absorb a rider's power output, resulting in wasted effort.

Accordingly, rear suspension systems commonly incorporated on engine-driven vehicles, such as motorcycles, have proven undesirable for use with pedal-driven vehicles, such as mountain bike is. In addition, because a mountain bike is propelled solely by power output from the rider, it is desirable that the rear suspension assembly be lightweight. Rear suspension systems of engine-driven vehicles commonly emphasize strength over weight and, therefore, have not been widely incorporated on mountain bikes.

Mountain bike rear suspension designs, utilizing multiple linkage members, are currently used and are often effective at isolating pedal-induced and brake-induced forces from acting on the rear suspension. However, one problem associated with prior mountain bike rear suspension designs involves placement of the rear shock absorber. Due to the relatively complex nature of common mountain bike rear suspension assemblies, the placement of the rear shock absorber has often precluded the use of a traditional triangular main frame of the mountain bike.

A common rear suspension arrangement for a bicycle frame assembly includes an articulating sub-frame having a lever assembly or link that couples a portion of the sub-frame to a main frame of the bicycle frame assembly. The link may also support one end of a shock absorber operably coupled between the main frame and the sub-frame. The link often includes a pair of lever arms, which are spaced from one another in a lateral direction and interconnected by a crossbar portion such that the lever arms move together as a unit. However, a disadvantage of such an arrangement is that a clearance space must be provided to accommodate the crossbar portion throughout the range of movement of the link during articulation of the sub-frame. Such an arrangement can place limitations on the design of the remainder of the frame assembly. For example, sometimes the seat tube is provided in two distinct portions with an interrupted intermediate section, which provides a clearance space to accommodate movement of the link. As another example, the rear shock may be positioned within the internal space defined by the main frame and the movement of the link may also take place within this space, thereby limiting the availability of this space for other purposes.

SUMMARY OF THE INVENTION

There exists a continuing need to develop new configurations for the placement and mounting of rear suspensions on bicycle frames. Along with this need, there also exists a need to develop new designs for shocks and shock mounting equipment such as linkages to facilitate the new configurations for the placement and mounting of rear suspensions on bicycle frames.

Certain embodiments of a bicycle assembly can comprise a main frame, a sub-frame configured to rotate with respect to the main frame, a linkage and a shock. The main frame can comprise a seat tube, a head tube and a connecting tube connecting the seat tube and the head tube. The sub-frame can comprise a pair of seat stays and a pair of chain stays. The shock can comprise a shock body and an extension body integral with the shock body. The extension body can comprise a pair of extension arms which straddle the seat tube and connect the shock to the linkage. The linkage can align the shock and the seat stays of the sub-frame.

In some embodiments, the bicycle assembly can further comprise a bottom bracket and the seat tube can extend from the connecting tube to the bottom bracket.

A shock according to certain embodiments can comprise an air spring with an outer sleeve. The outer sleeve may or may not screw into the extension body. The shock can comprise three eyelets, one on the shock body and one on each extension arm.

Some embodiments of a bicycle frame comprise a main frame, a sub-frame configured to rotate with respect to the main frame and a shock. The main frame can comprise a seat tube, a head tube and a top tube connecting the seat tube and the head tube. The shock can comprise a shock body, a pair of extension arms connected with the shock body and an adjustment knob on at least one of the extension arms, wherein the adjustment knob adjusts a parameter of the shock. The extension arms can straddle the seat tube and connect the shock to the sub-frame at a first pivot point, the shock connected to the main frame at a second pivot point. The adjustment parameter of certain embodiments comprises one of rebound and dampening. According to certain embodiments, there are adjustment knobs on both extension arms.

In some embodiments of a bicycle frame, an axis of rotation of the adjustment knobs is perpendicular to a plane defined as the plane through the center of the main frame, such that a user sitting on a bicycle with the bicycle frame can reach down under the seat to the shock and adjust the shock, with damping easily accessible with one hand and rebound easily accessible with the other.

BRIEF DESCRIPTION OF THE DRAWINGS

These and other features, aspects and advantages are described below with reference to drawings of preferred embodiments, which are intended to illustrate but not to limit the present invention.

DETAILED DESCRIPTION OF THE PREFERRED EMBODIMENT

As discussed in the description of the related art, the complexities of rear suspension design often require bicycle frames to have geometry other than the typical triangular main frame. In addition, the seat tube is often interrupted or divided so that the suspension system, including the shock and linkages can have sufficient space to move.

A triangular main frame provides many benefits. For example, a triangular main frame can provide a balance between stiffness and weight. The triangular main frame can also easily connect the various components of the bicycle such as the seat, handle bars, crank and wheels, while minimizing the number of connecting tubes. This can reduce the number of pieces required for the frame, thereby reducing the weight of the frame. As there are direct connections between the main aspects or components of the bicycle, i.e. the seat, handle bars and pedals, the triangular frame maintains the stiffness and rigidity of the bicycle for increased control and handling.

Figure 1:
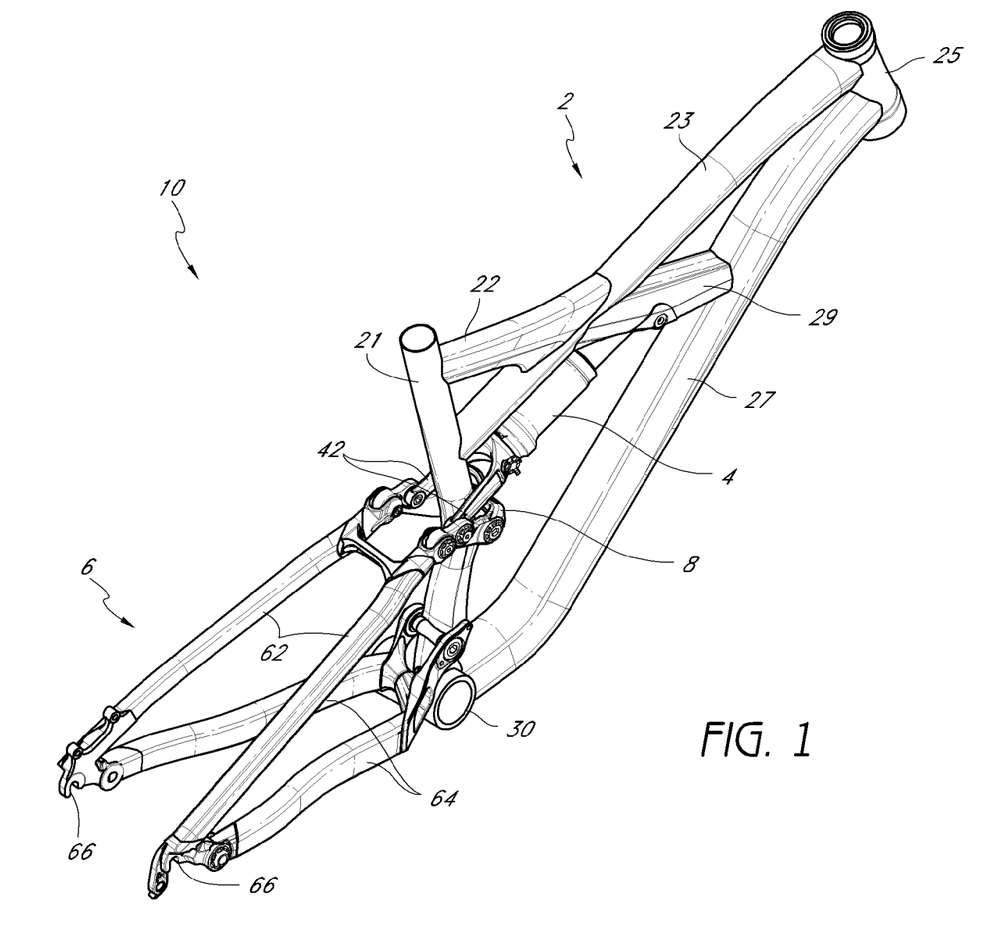
FIG. 1 illustrates a perspective view of an embodiment of a bicycle frame.

FIG. 1 shows a bicycle frame 10 with a rear suspension system. The bicycle frame 10 has a main frame 2, a shock 4 and a sub-frame 6. As can be seen, the main frame 2 can be a triangular main frame with an uninterrupted seat tube 21. A main frame 10 according to some embodiments comprises a seat tube 21, a top tube 23 and a head tube 25. The top tube 23 can connect the seat tube 21 and the head tube 25. A seat post with an attached saddle (not shown) can be installed in the seat tube 21. A steering post or column which connects the handle bars and the fork (not shown) can be installed in the head tube 25. Some embodiments may further include a bottom tube 27 and a bottom bracket 30. The bottom tube 27 can connect the bottom bracket 30 and the head tube 25. A crank (not shown) can be installed into the bottom bracket 30 to which pedals can be attached (also not shown).

According to some embodiments, the main frame 2 can further include one or more gussets or cross tubes 22, 29. The cross tubes can connect various parts of the main frame 2. For example, in FIG. 1, the cross tube 22 connects the seat tube 21 and the top tube 23 and the cross tube 29 connects the top tube 23 and the bottom tube 27. The cross tube 29 can connect the top tube 23 and the bottom tube 27 at a location spaced away from the ends of the top tube 23 and the bottom tube 27. The cross tubes 22, 29 can increase the frame's stability and allow for additional design features, such as a downward sloping top tube 23. In other embodiments, a single cross tube includes both cross tubes 22 and 29 combined into one piece and the main frame 2 is without the use of a top tube 23. In other embodiments, a top tube is used but only one cross tube 22 or 29 is present.

A cross tube can provide additional benefits to the bicycle frame, such as providing bracing and additional support. The cross tube can also provide a location to attach a shock 4, which will be explained in more detail below. Additionally, a cross tube can allow for more variation in frame design such as allowing for different sized or shaped tubes or different configurations such as narrower triangles on the main frame 2.

The sub-frame 6 of the bicycle frame 10 can include a pair of seat stays 62 and a pair of chain stays 64. Each seat stay 62 can connect with a corresponding chain stay 64 at or near a dropout 66. This connection can be fixed or pinned to allow for rotation. In some embodiments, the chain stays 64 are hingedly connected to the main frame at or near the bottom bracket 30.

A shock 4 can be connected to the main frame 2 at one end and connected to the sub-frame 6 at the other end. The shock 4 can be used to control the amount of movement between the main frame 2 and the sub-frame 6 and the rate of change in their relationships. As shown in FIG. 1, the shock 4 can have a pair of extension arms 42. The extension arms 42 can span the seat tube 21 to connect the shock 4 to the sub-frame 6. The extension arms 42 can also allow for the use of an uninterrupted seat tube 21.

In some embodiments, the bicycle frame 10 can also comprise a linkage 8. The linkage 8 is shown connecting the main frame 2, the shock 4 and the sub-frame 6. In this way the linkage 8 can be used together with the shock 4 to control the range of movement and the relationships between the main frame 2 and the sub-frame 6. In some embodiments, the shock 4 can connect directly to the sub-frame 6, with or without the use of a linkage 8. Also, as shown, the shock 4, the main frame 2 and the sub-frame 6 all attach to the linkage at different locations. In some embodiments, some of these connections are combined at one location.

Figure 2:
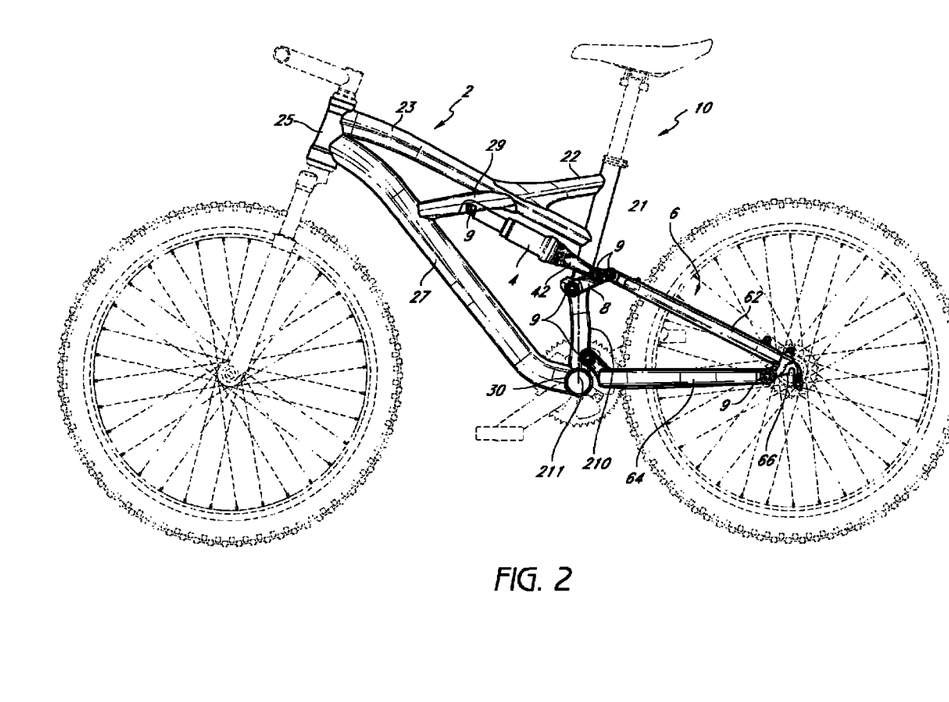
FIG. 2 is a side view of the bicycle frame of FIG. 1.

Further relating to the movement of the different parts of a bicycle frame, reference numeral 9 is used in some of the figures, such as FIG. 2, to show the various pivot points where some of the different components of the bicycle frame 10 are connected. The pivot points 9 can be connection points and in some embodiments and in some locations can include bearings, though this is not required. For example, some embodiments can have bearings where the shock 4 connects to the main frame 2 and to the linkage 8 and where the linkage 8 is attached to the main frame 2.

Figure 3:
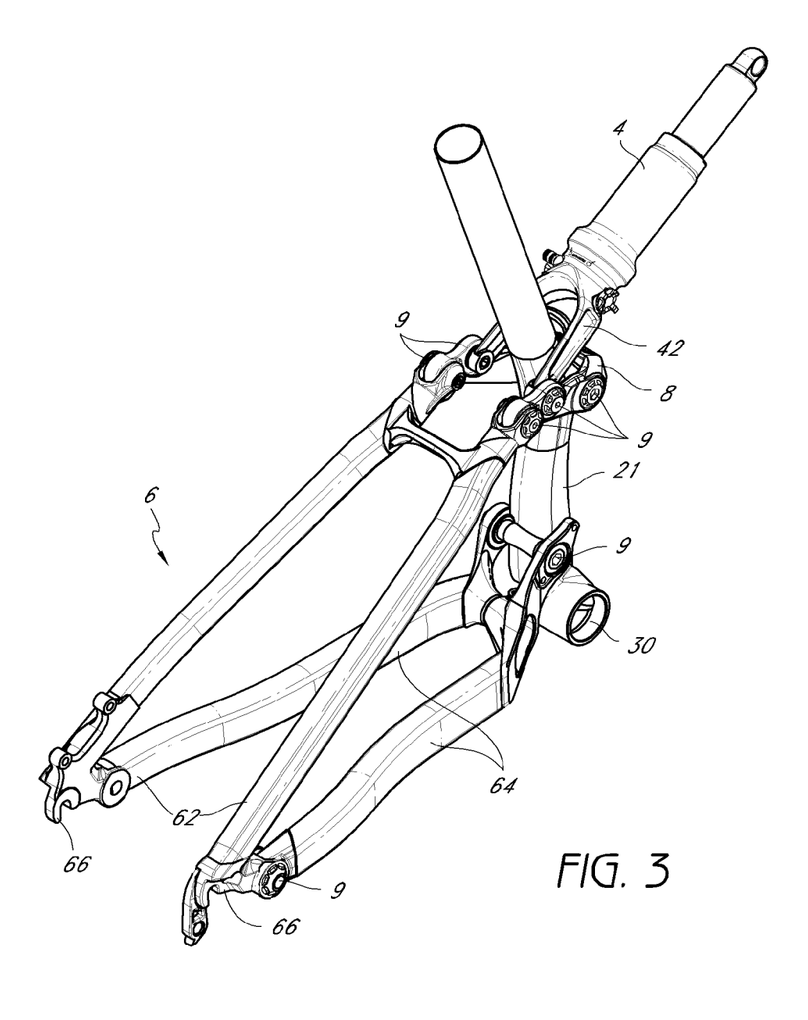
FIG. 3 is a perspective schematic view showing the extension arms of a shock surrounding a seat tube.
Figure 4:
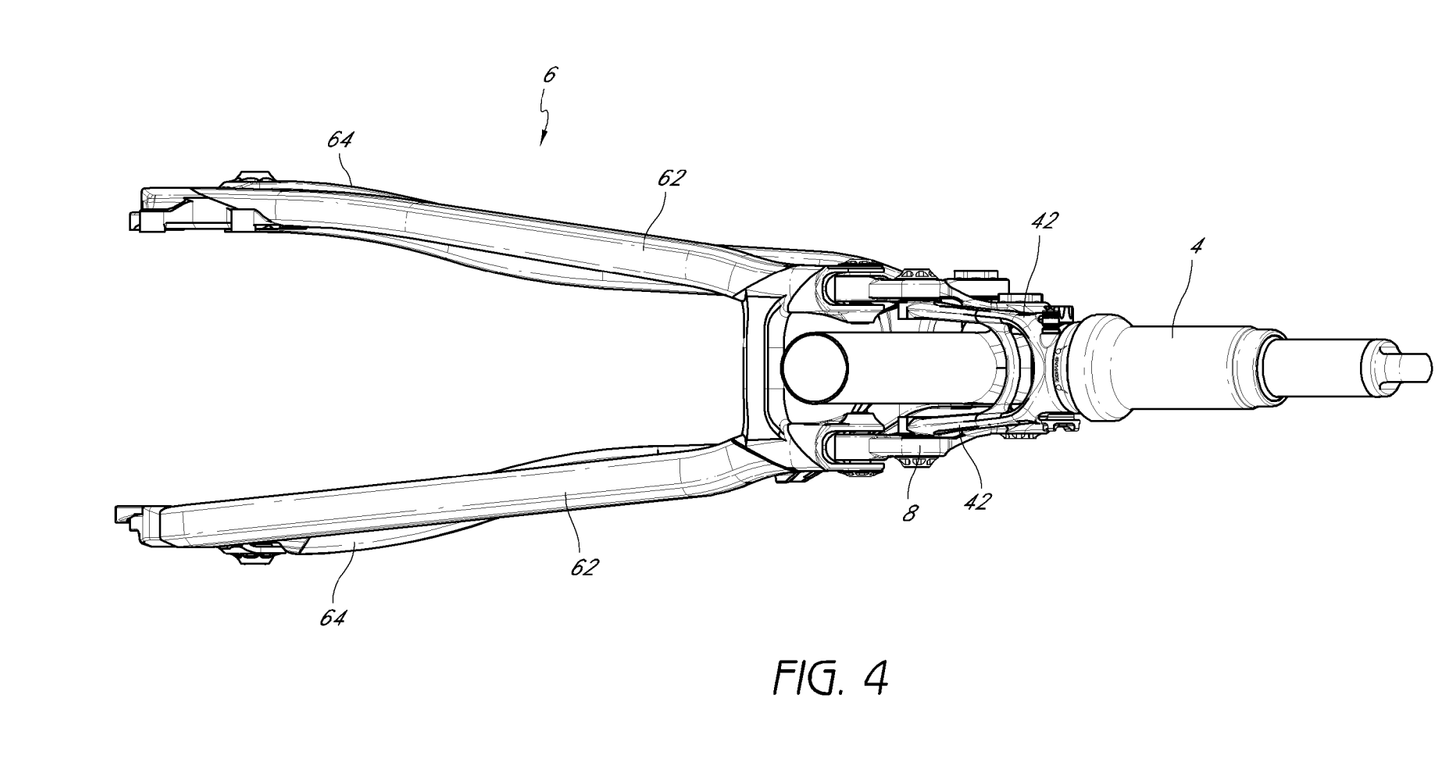
FIG. 4 shows a top view of the schematic view of FIG. 3.

Looking at FIGS. 3 and 4, a shock 4 with extension arms 42 is shown that is able to span the seat tube 21 allowing for the use of a full length or uninterrupted seat tube 21. It can also be seen that the shock's rear pivot points 9, where it is connected to the linkage 8 are behind the seat tube 21. Both of these features can provide additional benefits.

A full length seat tube 21 can connect the seat post (not shown) and the bottom bracket 30. A full length seat tube 21, according to some embodiments, can connect one end of the top tube 23 with one end of the bottom tube 27 (as shown in FIGS. 1 and 2). A full length seat tube 21 can advantageously allow for more power transfer from the rider to the pedals and crank at the bottom bracket 30. When the seat tube is split, the frame can experience flexing. This is undesirable as some of the power exerted by the rider towards the pedals will instead be directed to flexing the frame. This loss in power output is undesirable because of the decreased control that results and the increased energy needed to perform the same amount of work as a result of the flexing. In addition, a full length seat tube 21 allows for more adjustment capabilities for the seat post.

Moving the shock's rear pivot point behind the seat tube 21 and seat post is also advantageous because it is conductive to configuring the four-bar suspension arrangement for optimal performance. For example, the instant center of the four-bar suspension or linkage can be configured to be in a neutral position in relation to a particular desired chain line. In addition, this configuration allows for a seat stay 62 that is shorter than is required by a pivot in front of the seat tube. The shorter seat stay 62 is lighter weight and stiffer. Because of this stiffer arrangement, there is reduced rear brake "chatter."

Figure 5:
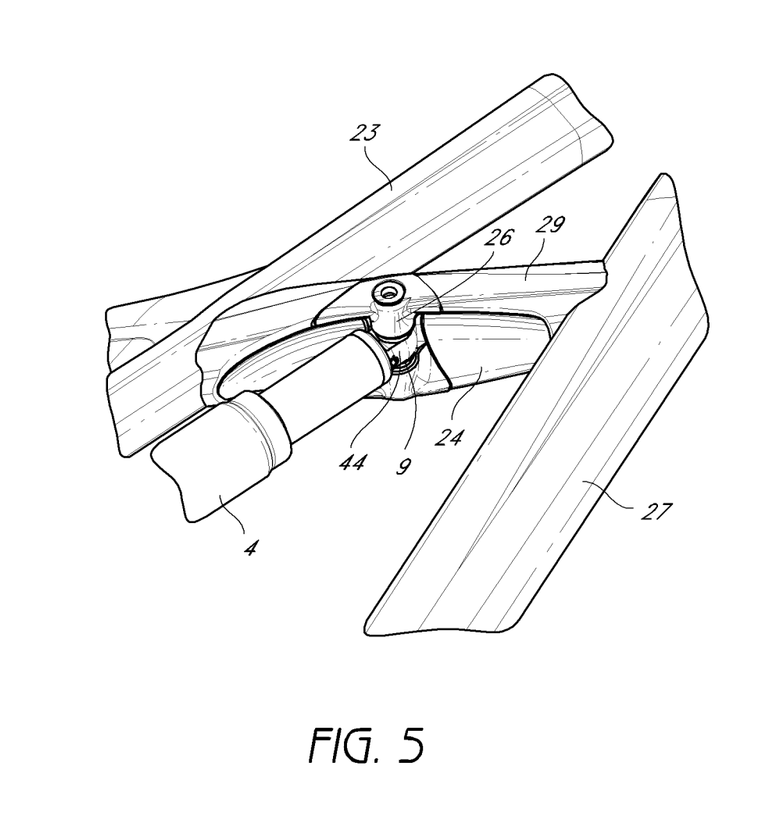
FIG. 5 shows a detail view of a connection location and pivot between a shock and a bicycle frame.
Figure 6:
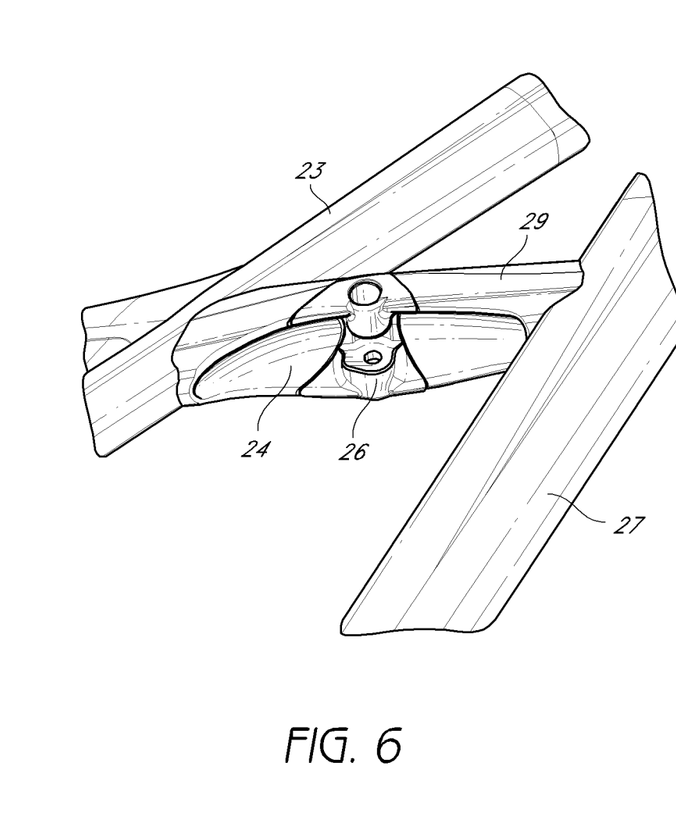
FIG. 6 shows the connection location of the bicycle frame in FIG. 5 with the shock removed.

Now moving to FIGS. 5 and 6, a shock 4 can attach to the main frame 2 at an opening or recess 24. As shown, the recess 24 is in the cross tube 29. The recess 24 can have an attachment 26. In some embodiments, the cross tube 29 is hydroformed. The cross tube 29 can have a cutout where the attachment 26 is welded into the cross tube 29. The attachment 26 may include, for example, a forging, a mount, mounting hardware, bearings, rods, pins, spacers, bolts, nuts, washers, fasteners, securing fasteners and/or quick release levers. The shock 4 can have an eyelet 44 that can be used to attach the shock 4 to the main frame 2 at the attachment 26. This can be accomplished, for example, by threading a fastener through a mount with a hole and the eyelet 44 and securing the fastener. This attachment location can also form the front pivot point 9 for the shock 4.

Attaching the shock 4 at a cross tube can have many advantages. For example, the shock 4 can be positioned in an optimal position. The cross tube 29 can allow for the shock 4 to be connected at a location between the top tube 23 and the bottom tube 27. In this way the stress from the shock 4 can be spread out over the frame, or over two tubes instead of one. Attaching the shock 4 to the cross tube 29 can allow the shock 4 to be aligned with the seat stays 62, or the top tube 23 or both. This can allow the shock 4 and the rear suspension system as a whole to be more responsive.

Referring back to FIG. 2 in regards to the above discussion, attaching the shock 4 to the main frame 2 at the cross tube 29 can allow the shock 4 to be located substantially parallel to the top tube 23. This configuration advantageously reduces the amount of space required by the shock 4 in use. This is because the design allows the shock 4 to essentially be compressed or expanded without using additional space within the main frame 2. The movement of the linkage 8 can be configured to be mostly behind and/or to the sides of the seat tube 21. This allows for the space in the main frame 2 to be used for other things such as the attachment of water bottles, water bottle cages, frame mount air pumps, etc.

The rear suspension design shown in FIGS. 1 and 2 has additional benefits. For example, because the shock is essentially aligned with the seat stays 62, there is a decrease in the load experienced through the linkage 8 at the seat tube 21. Most of the force from the movement of the seat stays 62 is absorbed by the shock 4. In this way the system is very responsive to the terrain. The linkage 8 acts as a lever with the connection at the main frame 2 being the fulcrum. The force from the movement of the seat stays is the load and the shock provides a contracting force to the load. Because of the overall design, the force experienced at the fulcrum may be greatly reduced compared to certain previous designs. This allows for a simpler construction for mounting the linkage 8 onto the seat tube 21. For example, in certain prior designs, a forge mount, a bracket or other separate piece of hardware was used to mount the linkage 8 to the main frame 2 to account for the high loads experienced at this point. The design also allows for the use of bearings at all of the connection points. This can reduce the friction in the system and make the system even more responsive to the terrain.

Figure 7:
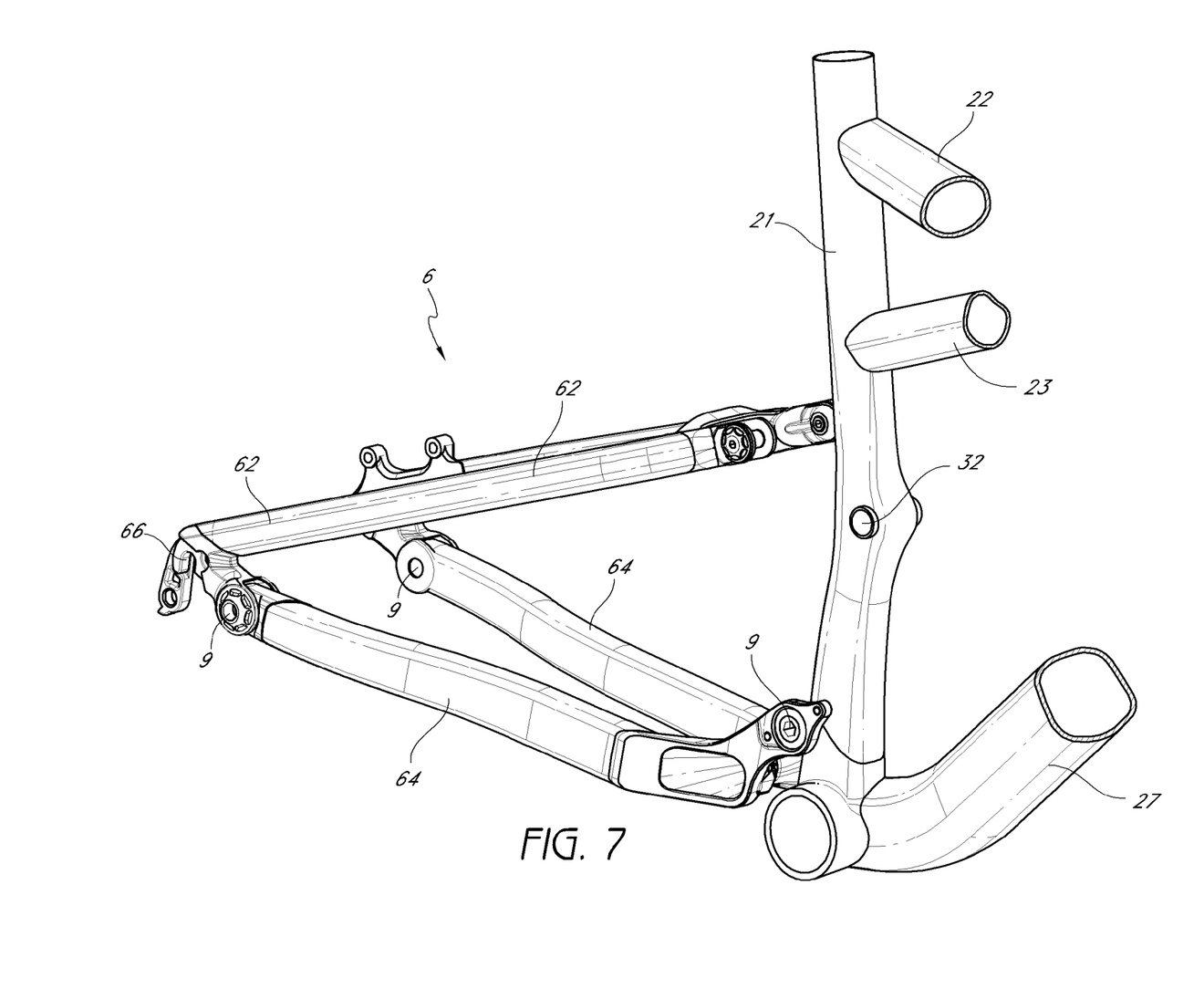
FIG. 7 is a partially disassembled and cutaway view of a frame showing the seat tube and the sub-frame assembly.

According to some embodiments, a mount 32 as shown in FIG. 7, can be hydroformed in the main frame 2 at the seat tube 21. This can create a bulge in the seat tube 21 which can provide the mounting location for the linkage 8. Therefore the linkage 8 can be connected directly to the frame without the use of a separate bracket resulting in cost savings, and reduction in parts over certain prior designs. In some embodiments, a cylinder can be attached to the main frame 2 at the mount 32. For example, a cylinder can be inserted into the mount 32 and welded into place. This cylinder can provide a stronger and more accurate connection location while still reducing the cost of making and attaching a separate bracket.

Figure 8:
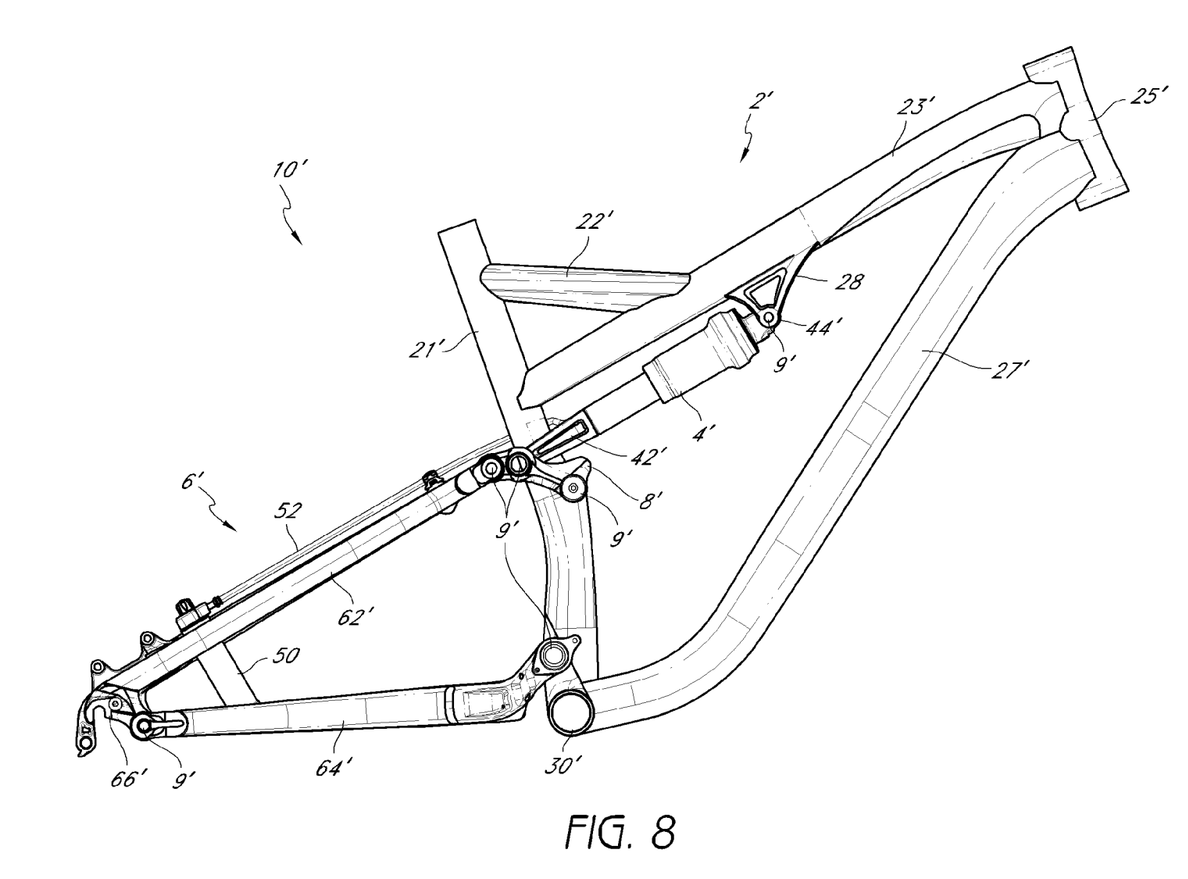
FIG. 8 illustrates a perspective view of another embodiment of a bicycle frame.

Turning now to FIG. 8, another embodiment of a bicycle frame 10' is shown. Numerical reference to components is the same as in the previously described arrangement, except that a prime symbol (') has been added to the reference. Where such references occur, it is to be understood that the components are the same or substantially similar to previously-described components.

The bicycle frame 10' has a main frame 2' and a sub-frame 6'. It also has a shock 4'. The shock 4' has extension arms 42', a fluid reservoir 50 and connecting hose 52. The shock 4' is attached to the main frame 2' via a bracket 28.

Though bicycle frames 10 and 10' show particular shocks 4 and 4', the different frames 10, 10' could use either shock shown or different shocks. For example, shocks utilizing a coil spring, air, oil, other fluid and/or various combinations of these or other shock absorbing mechanism can be used.

As will be appreciated, bicycle frame 10' exhibits many similar qualities as bicycle frame 10 discussed above. In particular, a full length seat tube 21' and a shock 4' with extension arms 42' are shown, as are some additional similar features. Additionally, according to some embodiments, the linkage 8' can be attached to the main frame 2' at the seat tube 21' without the use of an additional mount.

Shock

Figure 9:
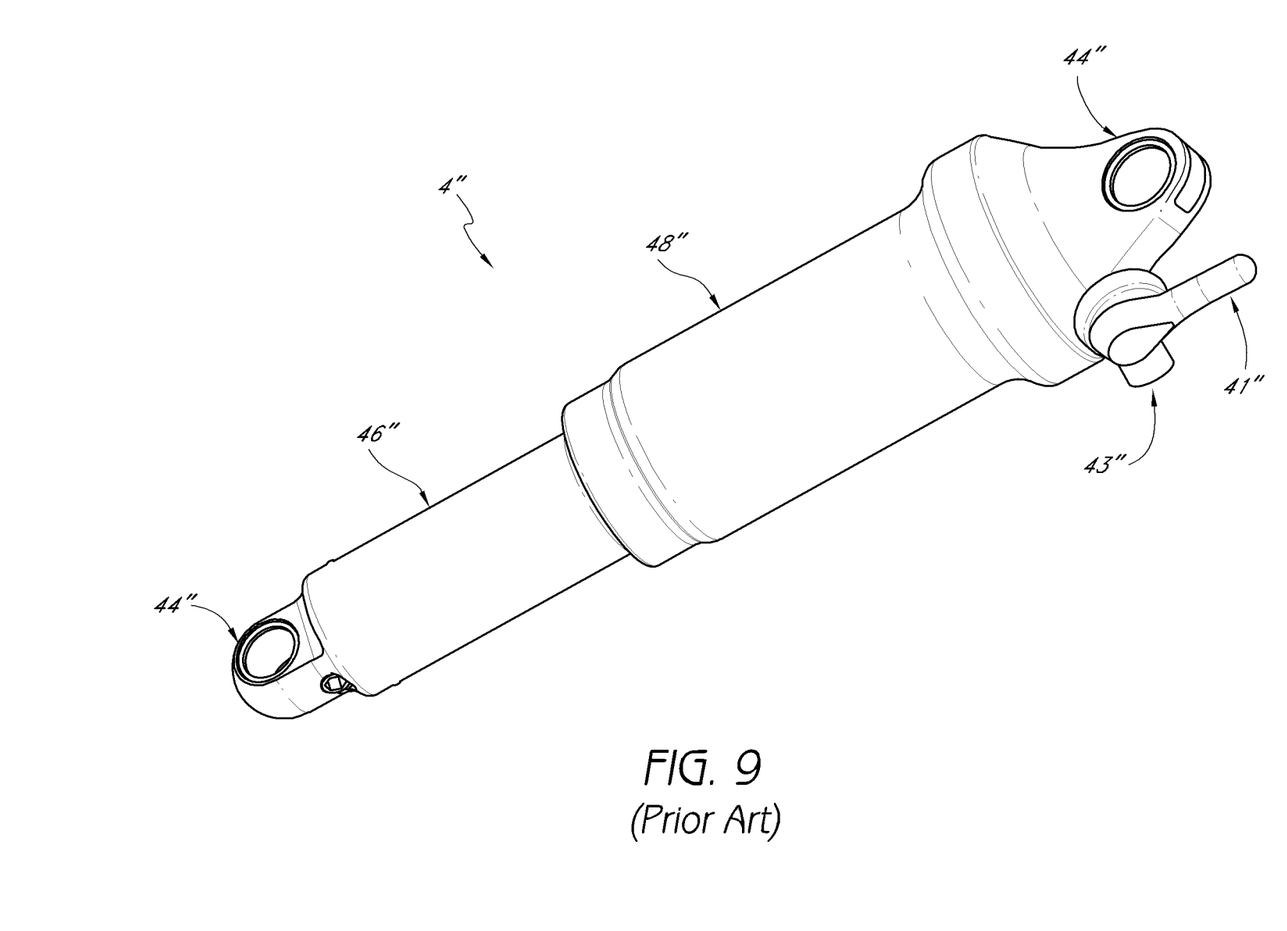
FIG. 9 is a perspective view of a prior art shock.

Shock 4", shown in FIG. 9, is a commonly available fluid shock. The shock 4" has an eyelet 44" at either end to attach the shock 4" to a bicycle frame as part of a rear suspension. The shock 4" as shown also has an outer portion 48" and an inner portion 46". The outer portion 48" shown comprises a sleeve that is an air spring. Other types of shocks may have an outer portion 48" comprising a metal coil spring surrounding the inner portion 46" instead of the sleeve air spring shown. The shock 4" can have a pressure control 43" for adjusting the pressure of the shock 4". For example, if the shock 4" is an air shock, the pressure control 43" can be a Schrader or Presta valve for connecting an air pump and adjusting the spring pressure within the shock 4". If the shock 4" has a coil spring the pressure control 43" can be a preloading ring, as is known in the art.

The shock 4" can also have adjustment knobs 41". The adjustment knobs 41" can include adjustments for dampening, rebound and other adjustments. The adjustment knobs 41" are often found near the eyelet 44" and are mounted in a position perpendicular to the axis of the eyelet 44" to allow for sufficient clearances to attach the shock 4" to a bicycle frame at the eyelet 44".

Figure 10:
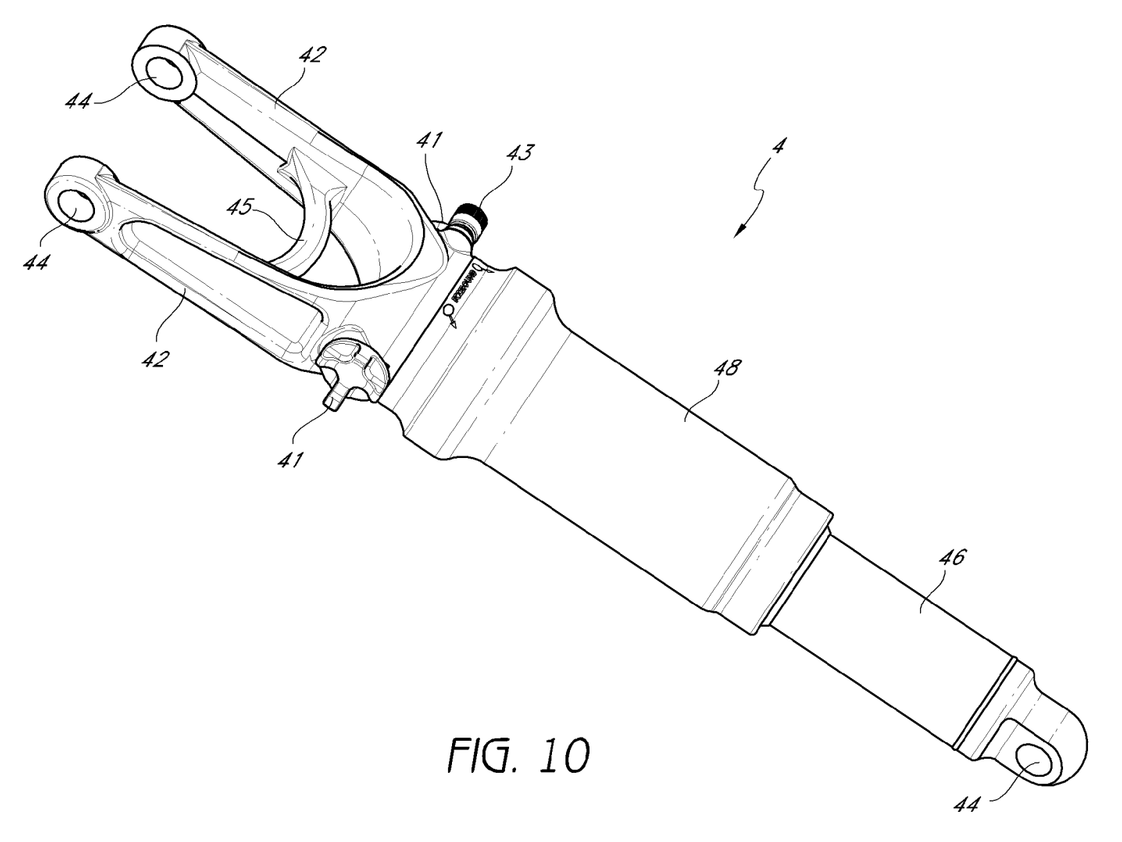
FIG. 10 is a perspective view of an embodiment of a shock.
Figure 11:
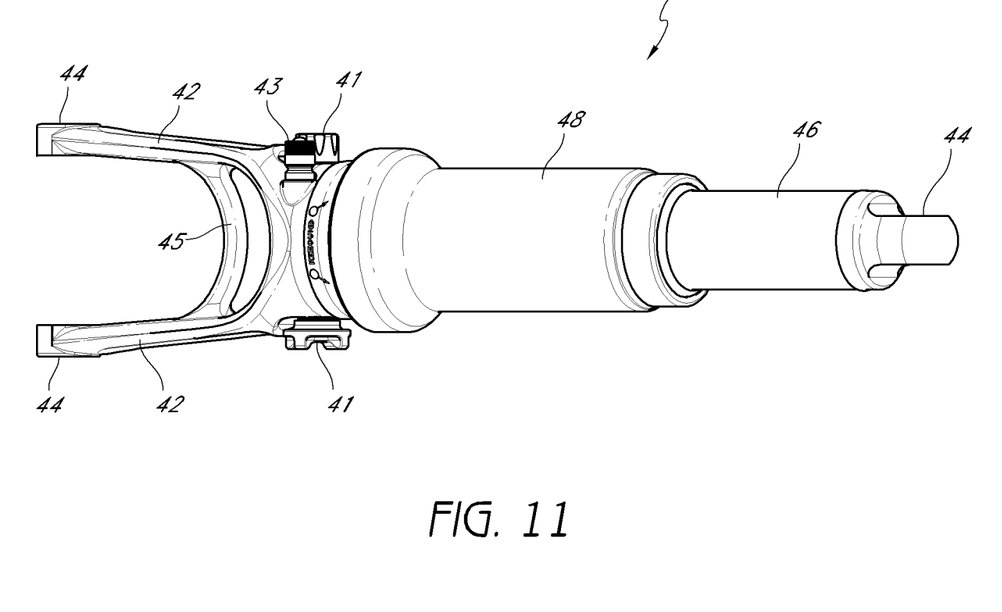
FIG. 11 illustrates a top view of the shock of FIG. 10.

A shock 4, according to some embodiments is shown in FIGS. 10 and 11. The shock 4 has a first end with an eyelet 44, an inner portion 46, an outer portion 48 and a second end with a pair of extension arms 42. Each extension arm 42 can have an eyelet 44 at one end and can be connected to the rest of the shock 4 at the other end. The extension arms 42 can be made as an integral part of the shock 4. The extension arms 42 can increase the length of the shock 4. This increased length of the shock 4 can change the pivot points at which the shock 4 is attached to the bicycle frame and thereby change the relative motions that the shock 4, main frame and sub-frame can experience in relation to one another. The extension arms 42 can also allow the shock 4 to span the seat tube or other tubes without the tube having to be divided or broken up.

Another advantage of a shock 4 with extension arms 42 is that they can allow the shock 4 to rotate at one pivot point in front of a particular tube and at one pivot point behind a particular tube. For example, a shock 4 can have one pivot point in front of the seat tube and one pivot point behind the seat tube or alternatively behind the axis 211 of the lower portion 210 of the seat tube. The axis 211 can be determined at the sag position, where sag is the amount of travel the suspension compresses with a rider's static body weight on the bicycle.

Some embodiments of a shock 4 can further comprise a member 45 between the extension arms 42. The member 45 can be a support member to strengthen the extension arms 42 and spread the shocks and stresses more evenly across the two extension arms 42. The member 45 can also serve as a limiter to limit the rotation of the shock 4 with respect to the main frame.

A shock 4 can have controls or adjustments on the side or sides of the shock 4. The presence of the extension arms 42 allows for adjustments such as adjustment knobs 41 to be put on the sides of the shock 4. In previous designs, such as that shown in FIG. 9, there was not space on the sides of the shock for adjustment knobs because of the limited space surrounding the eyelet. This space was needed to provide clearance for the rotation of the shock and as an attachment location. For these reasons, the adjustment knobs were perpendicular to the axis of the eyelet, so that they would essentially stay out of the way of the primary purposes of the eyelet.

Having the adjustments, such as adjustment knobs 41 on the side of the shock 4 has many benefits. First of all, it is convenient to have the adjustment knobs 41 on the side of the shock 4 because the user can visually and clearly see the adjustments being made. If the user is standing next to the bicycle making the adjustments, they are likely to be on the side of the bike and will be able to easily see the adjustments being made. They will have a clear unobstructed view of the adjustment knob 41 plus any setting markings. If the user is on the bike, it is easy for them to reach down and make an adjustment with a normal rotational movement of their hand.

This is in contrast to certain previous designs. As has been discussed previously, one embodiment of a bicycle frame 10 with a shock 4 is shown in FIG. 1. If the shock 4" were to be installed in a generally horizontal manner similar to that shown in FIG. 1 (which may possibly require a split seat tube), the adjustment knobs 41" would be either facing downward or upward. If downward, then they face away from the top tube and the rider, and between the shock 4" and the bottom tube. If facing upward, the adjustment knobs 41" would be between the shock 4" and the top tube. There are many drawbacks to these configurations. For example, the top and bottom tubes form an acute angle where they connect to the head tube which results in little space between the shock 4" and either the top tube or the bottom tube. This would make it more difficult to adjust the adjustment knobs 41". Additionally, if the adjustment knobs 41" are facing downward, which is the more typical configuration for a generally horizontal shock; a user must get down underneath the shock 4" to see the settings of the adjustment knobs 41" and it can also be awkward to adjust the shock while the user is sitting on the bicycle because of the lack of clearance.

In addition, if the rider is able to place or connect additional items within the main frame such as water bottles, this has the affect of further decreasing the clearances between the various objects and the adjustment knobs 41" and increases the difficulty of making adjustments.

The configuration shown in FIGS. 10 and 11 overcomes many of these shortcomings. For example, a user does not have to reach around or under the top tube or the shock or reach between the shock and a tube where there is limited space to make an adjustment to the shock 4. This design puts the adjustment knobs 41 in a good position to the sides of the user so that the user can stop riding and easily reach down to make fine tuning adjustments. Further, the rider does not have to dismount or reach over forward in an awkward position, or reach under the top tube and shock to make adjustments.

Figure 12:
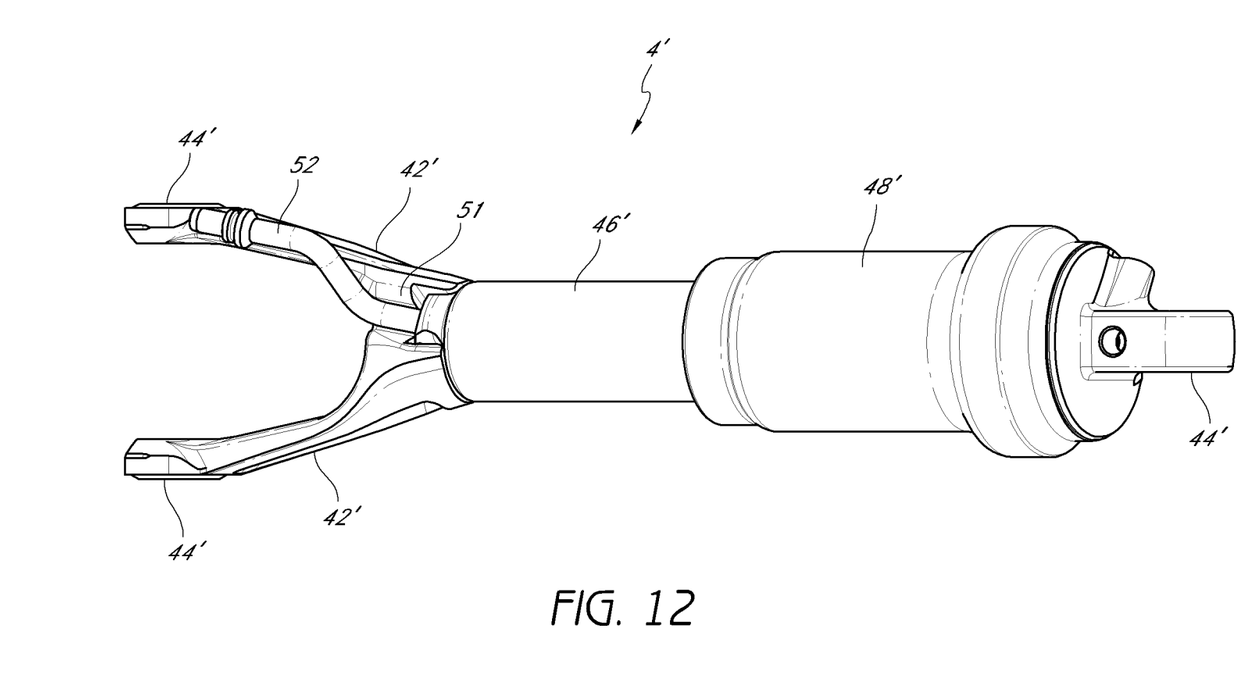
FIG. 12 illustrates a top view of another embodiment of a shock.

Another embodiment of a shock 4' is shown in FIG. 12. Shock 4', similar to shock 4 discussed above, also has extension arms 42'. Here the extension arms 42' are near the inner portion 46' instead of near the outer portion 48' as with shock 4. In some embodiments of the shocks 4 and 4' these relationships are reversed. As can also be seen, the shock 4' can be connected to a fluid reservoir 50 (FIG. 8) via hose 52. Some embodiments of shock 4' have adjustment knobs on the sides, for example on the extension arms 42'.

Figure 13:
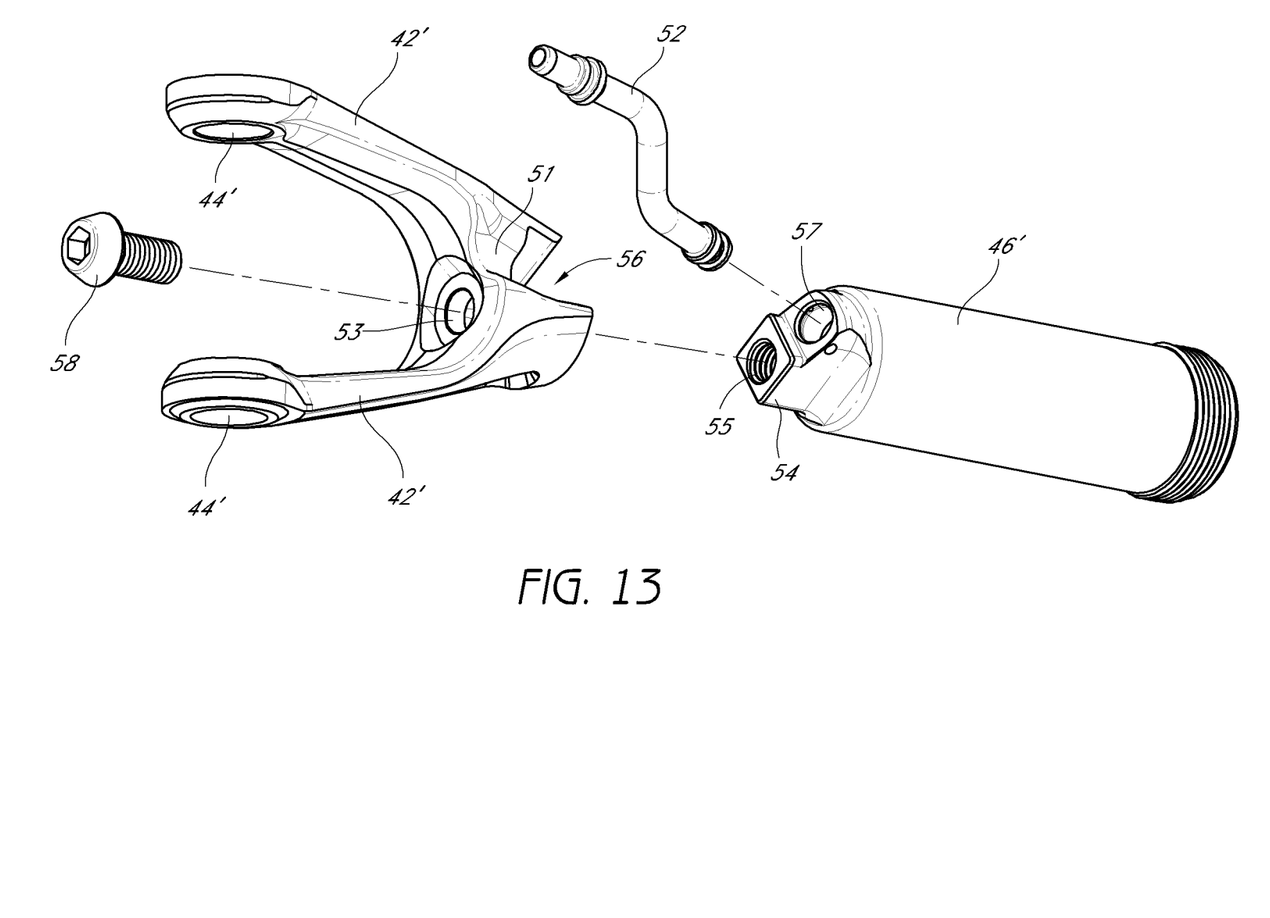
FIG. 13 shows an exploded partial view of the shock of FIG. 12.
Figure 14:
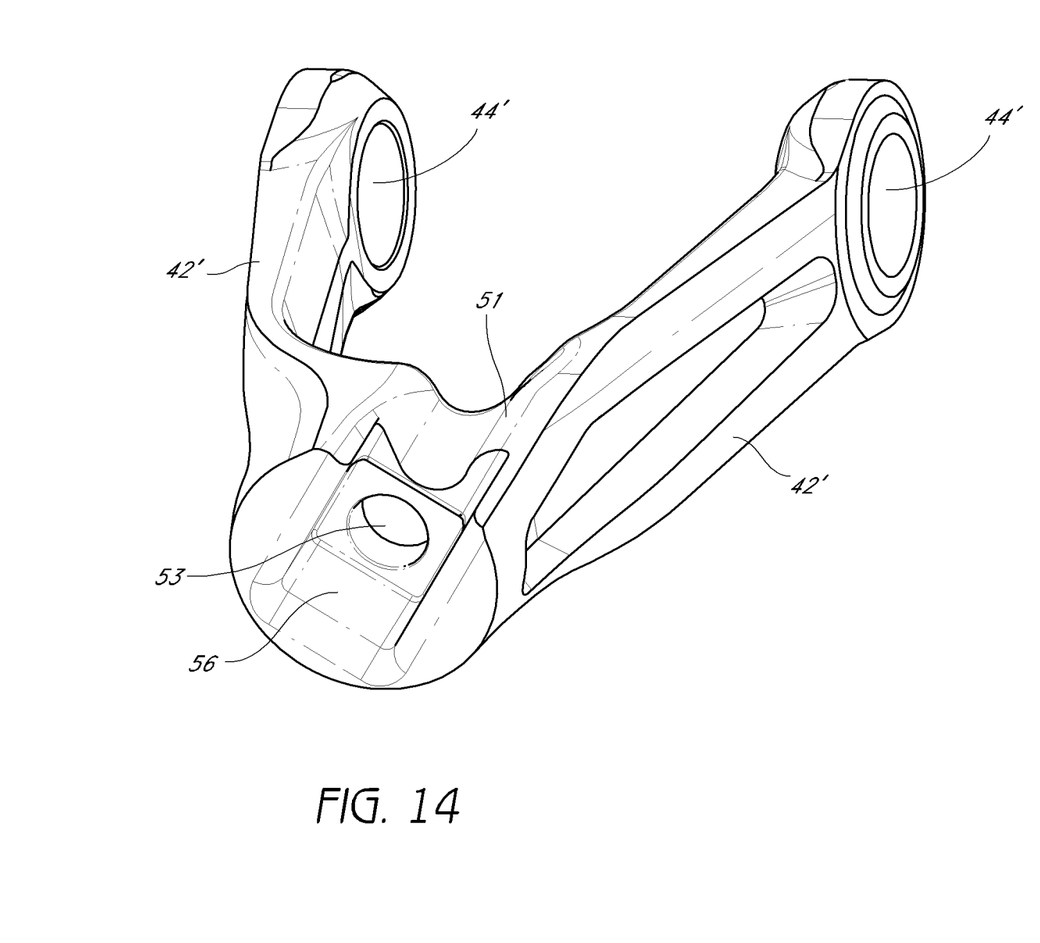
FIG. 14 is a perspective view of a part of the shock of FIG. 12.

Turning to FIGS. 13 and 14 an attachment between the extension arms 42' and the rest of the shock 4' will be described. The extension arms 42' can attach to the rest of the shock 4', though interlocking surfaces. One example of interlocking surfaces are the protrusion 54 and a socket 56 shown. In some embodiments, the protrusion 54 can fit into the socket 56 and a fastener 58 can securely hold them in place. The fastener 58 can pass through a hole 53 in the extension arms 42' and into a corresponding hole 55 in the inner portion 46'. As shown, the protrusion 54, in some embodiments, is on the inner portion 46' and the socket 56 is on the extension arms 42. In other embodiments, the socket 56 is on the inner portion 46' and the protrusion 54' is on the extension arms 42. In still other embodiments, the extension arms are configured to be attached to the outer portion 48'. In other embodiments, the shock utilizes a coil spring, instead of or in addition to a fluid shock and the extension arms 42 can be attached to one of either end of such a shock.

The protrusion 54 and socket 56 can be configured such that the extension arms 42' will not rotate with respect to the rest of the shock 4'. For example, the socket 56 can be rectangular, triangular, have at least three sides or have some other unique shape that limits rotation of the pieces once the protrusion 54 and the socket 56 are engaged.

Some embodiments of shock 4' can have an additional outside fluid reservoir 50. A hose 52 for connecting the shock 4' to the fluid reservoir 50 can connect to the shock 4' at an end of the inner portion 46'. The inner portion 46' can have a port 57 for connecting the hose 52 to the inner portion 46'. In addition, the extensions arms 42' can be contoured such that the hose 52 aligns itself with one of the extension arms 42'. This can allow the hose 52 to be protected by the extension arm 42'. This protection can help ensure that the hose 52 does not get damaged in use. For example, this protection can protect the hose 52 from getting caught or pinched between the moving pieces of the bicycle or the rear suspension. This protection can also help maintain a good connection between the tube and the shock. In addition, this can protect the tube from limbs, tree branches and other objects that could cause accidental snags and damage the hose 52. This feature has the additional of benefit of helping to ensure that the hose 52 does not get in the way when the rider reaches down to make an adjustment to the shock 4', especially if adjustment knobs are on the extension arms 42' and the rider is adjusting the knob on the tube side of the shock 4'.

The extension arms 42' can have a cutout 51 that the hose 52 can fit into. The cutout 51 can be a hole or channel in the extension arms 42' that the hose 52 can fit into. The fit can be snug or there can be extra space, though preferably the fit is snug.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present articulating linkage mounting assembly has been described in the context of particularly preferred embodiments, the skilled artisan will appreciate, in view of the present disclosure, that certain advantages, features and aspects of the mounting assembly may be realized in a variety of other applications, many of which have been noted above. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A bicycle assembly comprising:
   a main frame comprising a seat tube, a head tube, a top tube, and a down tube, wherein both the top tube and the down tube connect the seat tube and the head tube, the seat tube being a continuous seat tube that extends from the top tube to the down tube;
   a sub-frame configured to rotate with respect to the main frame comprising a pair of seat stays and a pair of chain stays, each one of the chain stays being pivotally connected to the main frame at one end and pivotally connected to one of the seat stays at an opposite end, each chain stay pivotally connected to one of the seat stays at or near a dropout configured for receiving an axle;
   a linkage pivotally connected to the seat stays and pivotally connected to the main frame, the connection to the main frame being a mount in one of the tubes of the main frame without the use of a separate mounting bracket on the outside of the main frame; and
   a shock comprising a shock body and an extension body integral with the shock body, the extension body comprising a pair of extension arms which straddle the seat tube and connect the shock to the linkage;
   wherein the linkage connects to and substantially aligns the shock and the seat stays of the sub-frame as viewed from the side of the bicycle assembly in a rest position.

2. The bicycle assembly of claim 1, further comprising a bottom bracket and wherein the seat tube extends from the top tube to the bottom bracket.

3. The bicycle assembly of claim 1, wherein the shock comprises an air spring with an outer sleeve.

4. The bicycle assembly of claim 3, wherein said outer sleeve screws into the extension body.

5. The bicycle assembly of claim 1, further comprising a dampening mechanism.

6. The bicycle assembly of claim 1, wherein the shock comprising three eyelets, one on the shock body and one on each extension arm.

7. The bicycle assembly of claim 6, wherein the shock further comprising a support member extending between the two extension arms.

8. The bicycle assembly of claim 7, wherein the support member is configured to limit the rotation of the shock with respect to the main frame.

9. The bicycle assembly of claim 1, further comprising a fork, a saddle and two wheels.

10. The bicycle assembly of claim 1, wherein the mount comprises a bulge in the tube.

11. The bicycle assembly of claim 1, wherein the mount in one of the tubes of the main frame comprises the seat tube.

12. The bicycle assembly of claim 1, further comprising a cylinder inserted into the mount.

13. The bicycle assembly of claim 1, wherein the mount passes through the tube.

14. A bicycle frame comprising:
   a main frame comprising a seat tube, a head tube and a top tube connecting the seat tube and the head tube;
   a sub-frame configured to rotate with respect to the main frame; and
   a shock comprising:
      a shock body;
      a pair of extension arms connected with the shock body; and
      an adjustment knob on at least one of the extension arms, wherein the adjustment knob adjusts a parameter of the shock;
   wherein the extension arms straddle the seat tube to establish a first pivot point, the shock connected to the main frame at a second pivot point.

15. The bicycle frame of claim 14, wherein the adjustment parameter comprises one of rebound and dampening.

16. The bicycle frame of claim 15, wherein there are adjustment knobs on both extension arms.

17. The bicycle frame of claim 16, wherein an axis of rotation of the adjustment knobs is perpendicular to a plane defined as the plane through the center of the main frame, such that a user sitting on a bicycle with the bicycle frame can reach down under the seat to the shock and adjust the shock, with damping easily accessible with one hand and rebound easily accessible with the other.

18. The bicycle frame of claim 14, wherein the sub-frame comprises a pair of seat stays and a pair of chain stays.

19. The bicycle frame of claim 14, further comprising a linkage connected to the main frame at the seat tube, and the connection is a bulge in the seat tube, no separate connection bracket being used.

20. The bicycle frame of claim 14, further comprising a fluid reservoir.

* * * * *